Jan. 28, 1969  H. J. MOON  3,424,510
DISPLAY CARTS WITH BUBBLE TOPS
Filed June 5, 1967
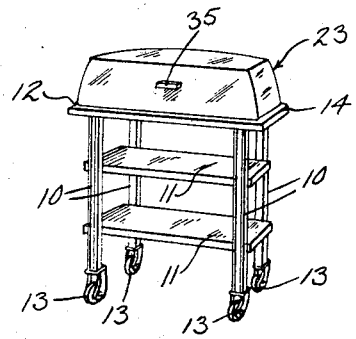
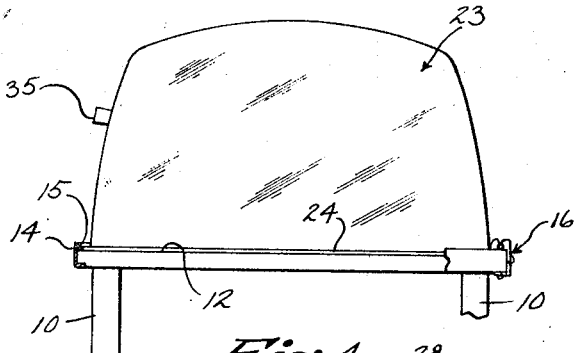
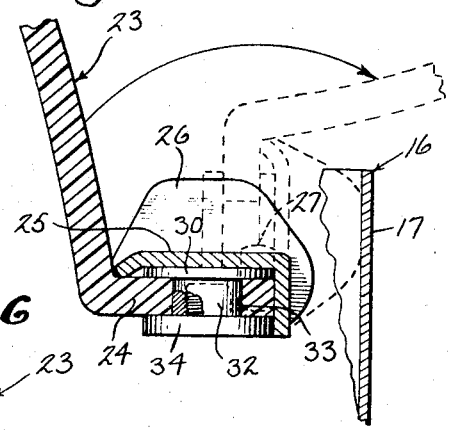
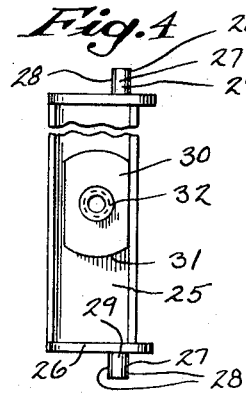
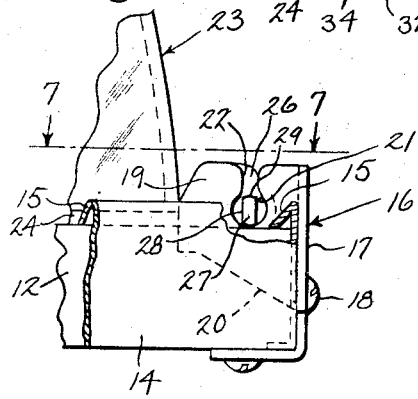
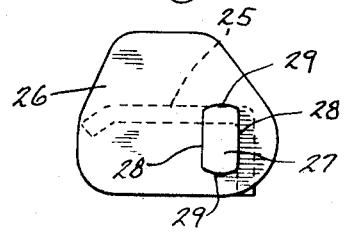
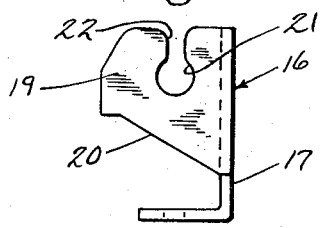
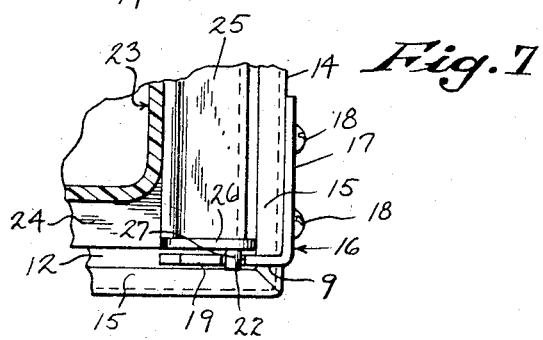
INVENTOR
Herbert J. Moon
BY
Morsell & Morsell
ATTORNEYS

# United States Patent Office 3,424,510
Patented Jan. 28, 1969

3,424,510
DISPLAY CARTS WITH BUBBLE TOPS
Herbert J. Moon, Milwaukee, Wis., assignor to Lakeside Manufacturing, Inc., Milwaukee, Wis., a corporation of Wisconsin
Filed June 5, 1967, Ser. No. 643,692
U.S. Cl. 312—284
Int. Cl. A47j 47/14
5 Claims

ABSTRACT OF THE DISCLOSURE

A display cart having an upper supporting surface with a transparent plastic bubble top therefore, said bubble top have a rearwardly projecting plastic flange, a metal reinforcing and supporting strip covering and secured over said flange and having hinge trunnions at its ends for coaction with hinge ears at the ends of the rear of the supporting surface whereby the plastic material is relieved of local hinging stresses, the hinge members including means for limiting upward folding movement of the bubble top to 90° while relieving the plastic of stress as it is supported in this position.

Background of the invention

*Field of the invention.*—The present invention relates to display carts for use in institutions, restaurants, hotels and the like of a type which have hinged bubble tops of plastic material to cover food items while permitting display.

*Description of the prior art.*—Heretofore the bubble tops of display carts of this type have been manufactured to swing rearwardly relative to the rear edge of the cart, there usually being a pair of piano type hinges connected to the plastic material. Inasmuch as these bubble tops are relatively large in size, a substantial strain is placed upon the plastic material adjacent the hinges, with the result that sooner or later the plastic material breaks.

Summary of the invention

The present invention provides hinge means for use in connection with the rear flange of a bubble top for a display cart, with said hinge means so constructed and arranged as to relieve the plastic material of local stresses and to distribute said stresses uniformly throughout the length of the rear flange of the bubble top.

A further object of the invention is to provide in a display cart as above described, cooperating metal hinge members which are constructed to limit upward hinged movement of the bubble top to a substantially 90° position and to support the bubble top in said raised position while minimizing strains on the plastic material.

A more specific object of the invention is to provide an improved display cart having a bubble top with a rearwardly projecting flange having spaced holes, a reinforcing and supporting strip having internally threaded sockets projecting from the under side thereof and extending through said holes to support the strip in a position covering the flange, and headed bolts threaded into said sleeves from below and having heads which clamp the flange between said heads and the metal reinforcing and supporting strip, the latter having trunnions projecting from the ends thereof which coact with trunnion openings at the ends of the table top to support the bubble for pivotal movement on the axis of said trunnions.

A further object of the invention is to provide a display cart as above described in which the construction is such that the bubble top, when in closed position, can be completely lifted off and placed in an out-of-the-way position, the arrangement also being such that, when the bubble top is swung upwardly, it is immediately locked against removal.

Brief description of the drawing

In the drawings, wherein the same reference numerals designate the same parts in all of the views:

FIG. 1 is a perspective view of the improved display cart;

FIG. 2 is a fragmentary end view showing the upper portion of the cart only, with the bubble top in closed position, and with part of the edge strip broken away from the edge of the supporting top;

FIG. 3 is a fragmentary vertical sectional view through the rear flange and a portion of the bubble top, the broken line position illustrating the position of the parts when the bubble top is swung to a 90° raised position;

FIG. 4 is a fragmentary view looking at the bottom of the reinforcing and supporting strip;

FIG. 5 is an end view of the reinforcing and supporting strip alone;

FIG. 6 is a fragmentary elevational view looking from a side at a corner of the table top, showing one of the hinge connections, parts being broken away and shown in section to more clearly show the hinge members;

FIG. 7 is a fragmentary view looking down on the mechanism of FIG. 6, as indicated by the line 7—7; and FIG. 8 is a view of one of the corner hinge brackets alone.

Description of the preferred embodiment

Referring more particularly to the drawings, the display cart shown in FIG. 1 may include upright legs 10, supporting horizontal shelves 11, and a top or supporting surface 12, there being a caster 13 on the lower end of each leg. The top may comprise a supporting surface of wood or any other suitable material surrounded by a metal edge strip 14 which projects somewhat above the supporting surface, as shown in FIG. 6, and has a downwardly bent flange 15 forming a rim.

A hinge bracket, one of which is illustrated in FIG. 8, and designated generally by the numeral 16, is secured to each of the rear corners of the table top in the manner shown in FIGS. 6 and 7. The bracket has a back wall 17 which is positioned against the edge strip 14 at the rear of the cart, being held in position by screws 18 which are anchored into the supporting surface 12 and has a bottom horizontal portion 8 which is screwed beneath the supporting top. Each hinge bracket has a right-angularly bent side 19 having its lower edge at an oblique angle as at 20. Each side 19 has a pivot hole 21 with a slot 22 extending from the upper edge of the side 19 and communicating with the hole 21. The rear wall of the table top 12 and the rear edge strip, as well as its flange, are slotted as at 9 to receive said side 19 as is clear from FIG. 7.

The bubble top may be formed of any suitable transparent plastic material, but an acrylic plastic, more specifically described as a methyl methacrylate monomer, is preferred. It is designated generally by the numeral 23 and has a lower edge, surrounding, right-angularly projecting flanges 24 which fit within the rim 15, as shown in FIGS. 1 and 2.

A metal supporting strip 25 is L-shaped in cross-section, as shown in FIGS. 3 and 5, and has each of its ends welded to an end plate 26 carrying a flattened trunnion 27. FIG. 3 shows the end plate at one end, and FIG. 5 shows the end plate at the opposite end. Referring to FIG. 5, it will be apparent that the trunnions are elongated in a vertical direction when the top is down, having flat sides 28 and top and bottom portions 29 formed on a radius. Secured to the underside of the strip 25 by projection welding or in any other suitable manner are spaced T nuts 30.

Each T nut comprises a head 31 which is secured to the underside of the strip and a downwardly projecting, internally threaded stem 32, each stem being received in one of the spaced holes 33 of the plastic flange 24. A headed screw 34 is threaded into each of the stems 31, as shown in FIG. 3, to clamp the flange between the heads of the screws and the heads 31 of the T nuts.

With the above construction the bubble top may be placed in the operative position by dropping the trunnions 27, one of which projects from each of the end plates 26, into the bracket slots 22 to the position shown in FIG. 6, which is the position assumed when the bubble top is in the covering position of FIG. 1. While in this position the bubble top may be completely removed by lifting straight upwardly, as the flattened trunnions 27 will readily pass through the slots 22.

When it is desired to raise the cover from the position of FIG. 1, the cover is pulled upwardly by means of the front handle 35. This causes the trunnions to rotate in the pivot holes 21 of the pivot brackets. As soon as such rotation starts the cover is locked against removal, due to the shape of the trunnions. When the bubble top reaches a position at substantially right angles to the position of FIG. 1, as indicated by the broken lines in FIG. 3, the flat edges 36 of the end plates engage the inner surfaces of the back walls 17 of the brackets 16, thus limiting any further rearward swinging movement and causing the supporting strains to be borne by the metal bracket parts. Any strains on the plastic are uniformly distributed throughout the length of the flange 24, and there are no concentrated local strains. The same is true during opening and closing movement of the bubble top. This is to be distinguished from the conventional construction where spaced piano hinges create local stresses on the plastic adjacent the hinge members proper.

It is apparent from the above that a very simple construction has been provided which is relatively inexpensive to manufacture and which will materially increase the life of the bubble top. It is also apparent that a very desirable type of hinge mounting has been provided which not only relieves the flange of the bubble top from local stresses, but provides a simple and foolproof hinge mounting which permits complete removal of the bubble top when it is down.

Various changes and modifications may be made without departing from the spirit of the invention, and all of such changes are contemplated as may come within the scope of the claims.

What I claim is:

1. In a display cart having a rectangular top supporting surface and having a bubble top shaped to cover said surface and formed of transparent material of a type which is susceptible to breakage when subjected to stress, said bubble top having a horizontal flange with an edge, wherein the improvement comprises a metal supporting and reinforcing strip extending substantially the length of said flange, means securing said strip to said flange, said strip being L-shaped in cross section to provide a bent portion confining the edge of said bubble top flange, an end plate rigidly secured to each end of said L-shaped strip with the bubble top flange disposed between said end plates, hinge means projecting from each end plate, and cooperating hinge means carried by said top supporting surface whereby said bubble top may be swung to and from open position with the strains uniformly distributed throughout the length of said bubble top surface.

2. A display cart as claimed in claim 1 in which the hinge means on each end plate is a trunnion, and in which the cooperating hinge means on the supporting surface comprises spaced brackets having bearing openings for rotatably receiving said trunnions.

3. A display cart as claimed in claim 2 in which the trunnions are flattened, and in which the brackets have circular openings within which said flattened trunnions are rotatable, there being slots communicating with said openings with which the flattened trunnions aline when the bubble top is down, the slots being so located as to permit complete removal of said top only when the bubble top is in said down position.

4. A display cart as claimed in claim 2 in which the brackets have upstanding wall portions which are engaged by edge portions of said end plates when the bubble top is swung to an approximately 90° open position.

5. A display cart as claimed in claim 1 in which the metal supporting strip fits over the bubble top flange and has longitudinally spaced T nuts with heads secured to its underside and with stems projecting through the bubble top flange, and in which there are headed screws threaded from beneath the bubble top flange into said T nuts to clamp the flange between the heads of said screws and the heads of said T nuts.

References Cited

UNITED STATES PATENTS

| | | | |
|---|---|---|---|
| 2,622,761 | 12/1952 | Linde | 16—171 X |
| 2,637,617 | 5/1953 | Stotter | 312—284 |
| 2,866,997 | 1/1959 | Eskridge et al. | 16—171 |
| 2,933,016 | 4/1960 | Kunde et al. | 16—171 X |
| 3,020,113 | 2/1962 | Molitor | 312—284 |
| 3,141,190 | 7/1964 | Reiss | 16—171 |
| 3,157,447 | 11/1964 | Devery et al. | 16—171 |
| 3,357,765 | 12/1967 | Molitor | 312—284 |

JAMES T. McCALL, *Primary Examiner.*

U.S. Cl. X.R.

16—171